United States Patent
Ishiyama

(10) Patent No.: US 8,365,784 B2
(45) Date of Patent: Feb. 5, 2013

(54) PNEUMATIC TIRE FOR MOTORCYCLE

(75) Inventor: Makoto Ishiyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 663 days.

(21) Appl. No.: 12/530,139

(22) PCT Filed: Mar. 10, 2008

(86) PCT No.: PCT/JP2008/054298
§ 371 (c)(1),
(2), (4) Date: Sep. 4, 2009

(87) PCT Pub. No.: WO2008/111556
PCT Pub. Date: Sep. 18, 2008

(65) Prior Publication Data
US 2010/0024938 A1  Feb. 4, 2010

(30) Foreign Application Priority Data

Mar. 8, 2007 (JP) .................................. 2007-059063
Jun. 19, 2007 (JP) ................................. 2007-161821

(51) Int. Cl.
*B60C 1/00* (2006.01)
*B60C 11/00* (2006.01)
(52) U.S. Cl. ................................ 152/209.5; 152/209.11
(58) Field of Classification Search ............... 152/209.5, 152/209.11
See application file for complete search history.

(56) References Cited

U.S. PATENT DOCUMENTS

| 5,829,503 | A | 11/1998 | Watkins et al. | |
| 7,942,178 | B2 * | 5/2011 | Nakagawa | 152/209.5 |
| 8,011,403 | B2 * | 9/2011 | Nakagawa | 152/209.5 |
| 2003/0000616 | A1 | 1/2003 | Watkins et al. | |
| 2006/0102266 | A1 * | 5/2006 | Ravasio et al. | 152/209.5 |
| 2007/0102083 | A1 * | 5/2007 | Hayashi | 152/209.5 |
| 2010/0132862 | A1 * | 6/2010 | Terada | 152/209.5 |
| 2010/0163145 | A1 * | 7/2010 | Nakagawa | 152/209.5 |
| 2010/0180996 | A1 * | 7/2010 | Nakagawa | 152/209.5 |

FOREIGN PATENT DOCUMENTS

| DE | 3637825 A1 * | 5/1987 |
| GB | 357419 A | 12/2004 |

(Continued)

OTHER PUBLICATIONS

Machine translation for Japan 08-072505 (no date).*

(Continued)

*Primary Examiner* — Steven D Maki
(74) *Attorney, Agent, or Firm* — Sughrue Mion, PLLC

(57) ABSTRACT

A pneumatic tire for motorcycles includes a carcass extending toroidally between a pair of bead portions, at least one ply of a belt layer installed outside thereof in the tire radial direction, and a tread portion radially outside the belt layer. In the tread portion, the 50% region of the developed width of the tread whose center is on the tire equatorial plane is a "tread center portion", the 25% regions of the developed width of the tread region on either side of the tread center portion are a "tread side portion", and each tread side portion is divided into three equal parts in the tire width direction defined from the tread end in order as regions A, B and C. The average modulus of elasticity in region B at 100% elongation at 40° C. is larger than the average modulus of elasticity in region A and in region C at 100% elongation at 40° C.

5 Claims, 4 Drawing Sheets

FOREIGN PATENT DOCUMENTS

| | | | |
|---|---|---|---|
| JP | 60-094804 A | * | 5/1985 |
| JP | 7-108805 A | | 4/1995 |
| JP | 08-072505 A | * | 3/1996 |
| JP | 9-136504 A | | 5/1997 |
| JP | 10-119513 A | | 5/1998 |
| JP | 2000-158910 A | | 6/2000 |
| JP | 2003-515487 A | | 5/2003 |
| JP | 2004-345432 A | | 12/2004 |
| JP | 2006-273248 A | | 10/2006 |

OTHER PUBLICATIONS

Machine translation for Germany 3,637,825 (no date).*
European Search Report dated Sep. 23, 2011 in Application No. 08721714.7.

* cited by examiner (a)

(b)

PNEUMATIC TIRE FOR MOTORCYCLE

TECHNICAL FIELD

The present invention relates to a pneumatic tire for motorcycles (hereinafter also referred to as simply "tire"), more particularly to a pneumatic tire for motorcycles which involves improvement of steering stability.

BACKGROUND ART

Because motorcycles have a characteristic that the motorcycle is leaned to make turns, the portion of the tire of the motorcycle which contacts a road surface shifts due to the lean of the body of the motorcycle. Further, when the motorcycle is upright, the velocity of the motorcycle is high and a braking force and a driving force in the front-back direction (equatorial direction of the tires) are applied. On the other hand, when the motorcycle turns with the body of the motorcycle leaned, a lateral force is mainly applied and the velocity of the motorcycle is decreased. Thus, the tread of the tire at a center portion and the tread of the tire at a shoulder portion are utilized differently. Particularly, the enhancement of grip ability of the tires of a bike when the bike is largely leaned is demanded by general consumers, and riders who participate in races.

From the above-described perspective, for example, Patent Documents 1 and 2 disclose the technology which improves the grip ability of the tire that is provided with a reinforcement comprising a reinforcing cord spirally wound at an angle approximately along the tire circumferential direction, that is, a spiral belt, by placing a soft rubber at the portion (tread end side) which contacts a road surface when the body of the motorcycle largely leans. In these patent documents 1 and 2, desired characteristics of the tire are allowed to appear by dividing the tread portion along the width direction into three sections, that is, a center section and shoulder sections on either side of the center section, and changing the hardness, modulus of elasticity, or the like of each section of the tread rubber.

Patent Document 1: Japanese Unexamined Patent Application Publication No. H07-108805 (Claims, etc.)
Patent Document 2: Japanese Unexamined Patent Application Publication No. 2000-158910 (Claims, etc.)

DISCLOSURE OF THE INVENTION

Problem to be Solved by the Invention

However, since performance improvement of tires is demanded as the performance of motorcycles is improved, further improvement of steering stability of the motorcycle when the bike is largely leaned, that is, grip ability of the tires is demanded. Further, securing wear resistance is one of important performance requirements of the tires.

Accordingly, the object of the present invention is to overcome the above-described problem and to provide a pneumatic tire for motorcycles wherein steering stability of the motorcycle at a turn is improved as compared with the conventional tires, by securing wear resistance as well as improving grip ability of the tire.

Means for Solving the Problem

As mentioned above, since a motorcycle turns with its body leaned, the portion of a pneumatic tire for motorcycles where the tread portion of the tire contacts a road surface differs according to whether the motorcycle is proceeding straight ahead or turning. That is, characteristically, the center portion of the tread is used when the motorcycle is proceeding straight ahead, and end portion of the tread is used when the motorcycle is turning. As for required performance of the tire, the tire is required to grip with respect to an input (i.e., acceleration or deceleration) in the circumferential direction (equatorial direction) of the tire when the motorcycle is proceeding straight ahead, and the tire is required to grip with respect to an input in the lateral direction (width direction) of the tire when the motorcycle is turning.

In order to turn a motorcycle at a high speed, the body of the motorcycle is required to be largely leaned to balance with the centrifugal force that increases as the turning speed increases. In addition, the tire is required to grip allowing for the centrifugal force. That is, the motorcycle cannot turn at a high speed in cases where the grip of the tire is insufficient when the body of the motorcycle is largely leaned. Therefore, the grip has a profound effect on turning performance when the body of the motorcycle is largely leaned. For this reason, the conventional approach has been that the types of rubber at the center portion of the tire and the shoulder portion of the tire are changed.

Considering the above, the present inventor conducted detailed study to improve the grip at a turn, particularly to improve intensively the grip approximately at a bank angle (camber angle=CA) of 45 to 50° at which angle the body of the motorcycle leans most largely. This is because, for example, at a race, the high turning speed is extremely important, and the higher the turning speed is, the higher the speed reaches on the straight following a corner, which results in an improvement in lap time. In addition, also on an open road, increasing grip at a turn may contribute to the safety.

Concerning the turning performance of the tire of the motorcycle when the body of the motorcycle is largely leaned, a grip is generated by contacting one end side of the tread of the tire to the road surface. When the body of the motorcycle turns with its body largely leaned, the contact condition of the tire with the road surface is as shown in FIG. 5 and FIG. 6. The contact shape of this case will now be discussed. It should be noted that, in FIG. 5 and FIG. 6, (a) represents a cross-sectional view in the width direction of the tire contacting the road surface, (b) represents the contact shape thereof, and FIG. 5(b) and FIG. 6(b) represents the deformations of the treads corresponding to each contact region with respect to a cross section in the circumferential direction and with respect to a cross section in the width direction respectively.

First, the cross section of the tire in the circumferential direction will be discussed. As shown in FIG. 5(a) and FIG. 5(b), the states of deformation of the tread portions in the region C which is near-center of the contact shape and in the region A which is near the end of the tread of the contact shape differ. Referring to the deformation of the tread portion in the tire rotation direction (also referred to as tire circumferential direction or tire front-back direction), the deformation near the center of the tire in the tread portion is in a driving state and the deformation near the tread end portion of the tire in the tread portion is in a braking state.

As used herein, the term "driving state" means a shear stress state in which, on the assumption that the tire be sliced along the tire circumferential direction, the sliced section of the tread deforms such that the surface of the tread which contacts a road surface deforms in a forward direction to the direction of the travel of the tire because the undersurface of the tread (the surface which contacts a skeletal member in the tire) have a shear stress in the backward direction to the direction of the travel of the tire. The deformation occurs just when a driving force is applied to the tire. On the other hand, the term "braking state" means the opposite of the driving state. In the braking state, the deformation of the tread is in a shear state such that the surface of the tread which contacts a road surface deforms in the backward direction to the direction of the travel of the tire because the inner side of the tire (belt) have a shear stress in the forward direction to the direction of the travel of the tire, which deformation corresponds to the movement of the tire during braking.

As shown in FIG. 5, when the motorcycle turns with the motorcycle body leaned with a large angle such that the CA equals 45°, even in the case when the tire rotates in a state that neither a driving force nor a braking force is applied to the tire, the contact region near the tread center portion is in a driving state and the contact region near the tread end portion is in a braking state. This is caused by the difference in radius (radius difference) in the belt portion of the tire. Since tires for motorcycles are well-rounded in their crown portions, the distances between the rotation axis and the belt with respect to the tread center portion and with respect to the tread end portion differ greatly. In FIG. 5, the radius R1 at the point near the tread center in the contact shape is obviously larger than the radius R2 at the point near the tread end portion in the contact shape. Because the angular velocity of the rotating tire is the same, the velocity at the belt portion (which means the tire circumferential direction velocity along the road surface, when the tire contacts a road surface; which is a product of the radius of the belt and the tire angular velocity) is higher in the case of R1 which is a radius larger than R2.

Although the tread surface of the tire does not have a shear stress in the front-back direction at the moment of the contact with a road surface, the tread surface of the tire suffer a shear deformation in the front-back direction when the tread surface of the tire detaches the road surface after proceeding together with the rotation of the tire while contacting the road surface. In this case, the tread near the tire center at which the velocity of the belt is high suffers a shear deformation in a driving state, while the tread near the tread end portion of the tire at which the velocity of the belt is low suffers a shear deformation in a braking state. In addition, at the center of the contact shape, there occurs little deformation in the cross section of the tread in the tire circumferential direction.

The above-described case will be discussed in terms of a tread developed width of the tire. When the motorcycle turns with the CA being 45 to 50°, approximately fourth of the width of the tread (the whole width of the tread) of the tire contacts a road surface. As shown in the following Figures, when the region which contacts a road surface is divided into three equal parts and named from the tread end in order as a region A, a region B and a region C, the region A is in a braking state, the region B is in a neutral state in which there is little deformation and the region C is in a driving state. The above refers to deformations with respect to the equatorial plane of the tire. The deformations in the region A in a braking state and in the region C in a driving state mean that the tread is inclined to slip in the tire circumferential direction because the tread deforms in the tire circumferential direction and a shear stress is applied. In other words, wear is caused at the region A and the region C.

Next, the deformation in the cross section in the tire width direction as shown in FIG. 6 will be discussed. The deformation of the tread in the lateral direction generates a camber thrust. This is because, when the trajectory of a circular arc is viewed from below, the trajectory is an ellipse when the tire has a camber and the belt moves along an elliptical arc. Therefore, the trajectory of the belt is crescent-shaped as shown in FIG. 6(b). On the other hand, the surface of the tread contacts a road surface at the leading portion and proceeds straight directly toward the trailing side. The difference between the crescent-shaped trajectory and the straight trajectory corresponds to a lateral shear of the tread. As can be seen from FIG. 6(b), this means that a large amount of lateral shear stress is applied to the portion in which the contact length is long. That is, among the region A, the region B and the region C, the contact length of the region B in a contact condition that the CA is 45 to 50° is the longest and the lateral shear stress is applied most to the region B. Because the contact lengths at the region A and the region C are short, generated forces at the region A and the region C are not as large as that at the region B. At the region A and C, the deformation in the tire circumferential direction (equatorial direction) which is described with respect to FIG. 5 is larger than the deformation in the width direction.

Considering the above-described behavior of the tread, the present inventor intensively studied to discover that, by specifying the predetermined moduli of elasticity in the regions A to C, a grip ability may be increased at the CA of 45 to 50° and an abrasion of the tread surface may be suppressed, to complete the present invention.

That is, the pneumatic tire for motorcycles of the present invention comprises bead cores embedded in each of a left-and-right pair of bead portions; at least one ply of carcass extending toroidally between said pair of bead portions; at least one ply of belt layer installed outside of the carcass in the direction of the radius of the tire; and a tread portion placed outside of the belt layer in the direction of the radius of the tire, wherein when, in said tread portion, the 50% region of the developed width of the tread whose center is on the tire equatorial plane is defined as "tread center portion", the 25% regions of the developed width of the tread region each of which is on the either side of the tread center portion are defined as "tread side portion", and each of the tread side portions is divided into three equal parts which are defined from the tread end in order as the region A, the region B and the region C, the average modulus of elasticity of the tread rubber in the region B at 100% elongation at a temperature of 40° C. is larger than the average modulus of elasticity of the tread rubber in the region A and in the region C at 100% elongation at 40° C.

In the present invention, the average moduli of elasticity of the tread rubber in the region A, the region B and the region C at 100% elongation at a temperature of 40° C. preferably satisfy:

the region B>the region C>the region A. Further, the tread rubber in the region B preferably comprises two layers which are an inner layer and an outer layer, and the average modulus of elasticity of the tread rubber in the inner layer at 100% elongation at a temperature of 40° C. is larger than the average modulus of elasticity of the tread rubber in the outer layer at 100% elongation at 40° C. Further, the tread rubbers which are the tread surfaces in the region A and the region B are preferably the same type of rubber. Still further, the present invention is also effective when the average modulus of elasticity of the tread rubber at 100% elongation at a temperature of 100° C. is employed in place of the average modulus of elasticity of the tread rubber at 100% elongation at a temperature of 40° C. Still further, in the present invention, the average tan δ of the tread rubber in the region B at a temperature of 100° C. is preferably smaller than the average tan δ of the tread rubber in the region C at a temperature of 100° C.

Effects of the Invention

By the above described constitution, the present invention may provide a pneumatic tire for motorcycles wherein steering stability of the motorcycle at a turn is improved as compared with the conventional tires, by securing wear resistance as well as improving grip ability of the tire.

Figure 1:
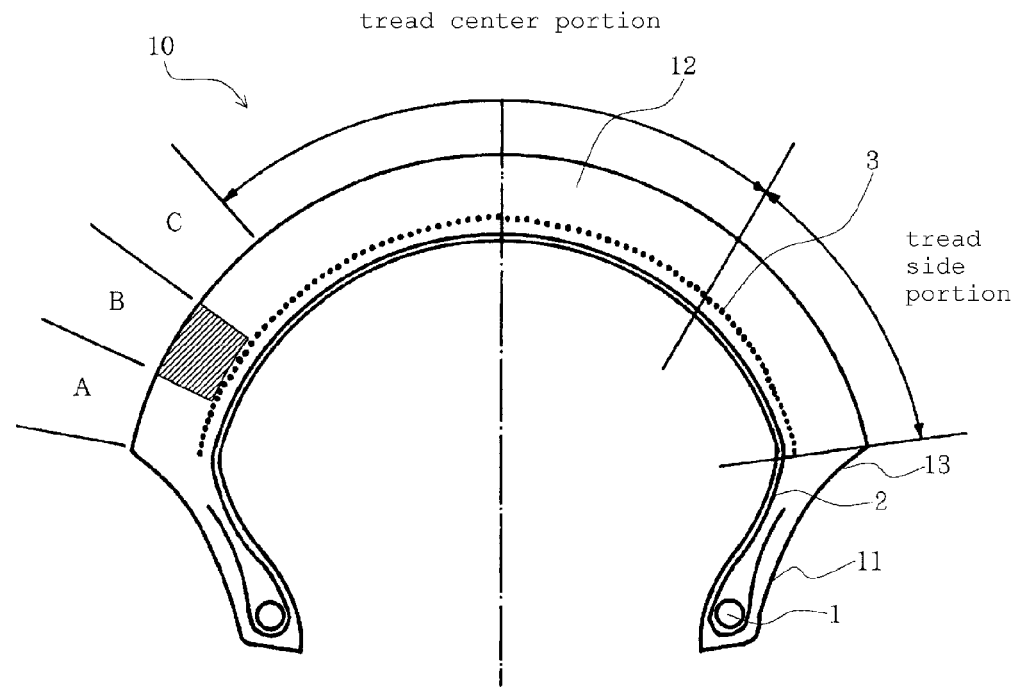
FIG. 1 is a width direction cross section of a pneumatic tire for motorcycles of one embodiment of the present invention.

REFERENCE NUMERALS 1 bead core
2 carcass
3 belt layer
10 pneumatic tire for motorcycles
11 bead portion
12 tread portion
13 side wall portion

BEST MODE FOR CARRYING OUT THE INVENTION

In the following, preferable embodiments of the present invention will be described in detail, referring to the drawings.

FIG. 1 represents a width direction cross-sectional view of the pneumatic tire for motorcycles of one preferable example of the present invention. As illustrated in the drawing, a pneumatic tire for motorcycles 10 of the present invention comprises bead cores 1 embedded in each of a left-and-right pair of bead portions 11; at least one ply of carcass 2 extending toroidally between said pair of bead portions 11; at least one ply of belt layer 3 installed outside of the carcass in the direction of the radius of the tire; and a tread portion 12 placed outside of the belt layer 3 in the direction of the radius of the tire.

In the tire 10 of the present invention, as illustrated, in tread portion 12, the 50% region of the developed width of the tread whose center is on the tire equatorial plane is defined as "tread center portion", the 25% regions of the developed width of the tread region each of which is on the either side of the tread center portion are defined as "tread side portion". As used herein, "to develop the tread" means "to make the tread which is round in the width direction a plane such that the arc on the tread is made into a straight line". In the present invention, letting the developed width be 100 parts, 50 parts of the developed width on the tread center portion corresponds to the tread center region and the rests of the region correspond to the tread side portions. That is, the tread side portions on the right side and the left side are 25 parts respectively.

Figure 5:
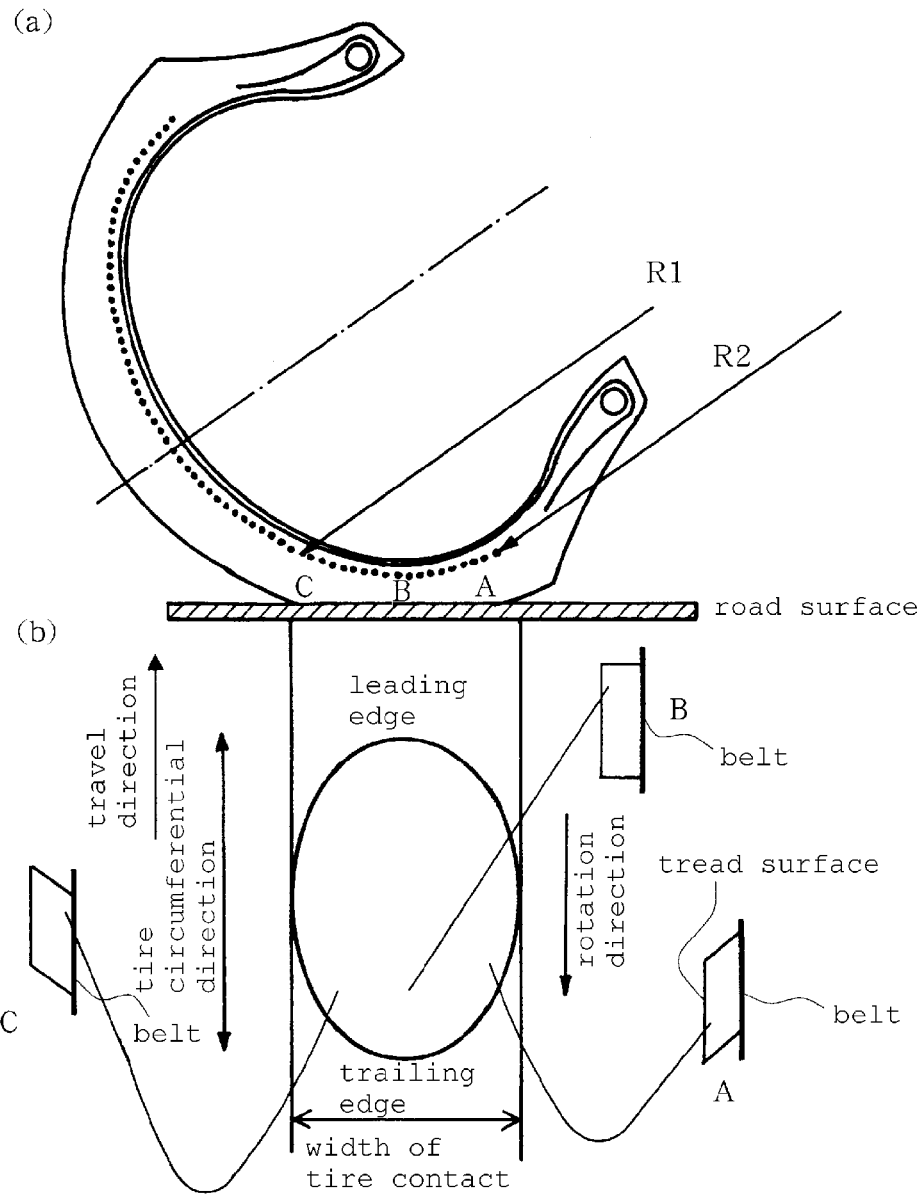
FIG. 5 is (a) a width direction cross-sectional view showing a contact condition, and (b) a illustration showing a contact shape and a state of deformation of the tread portion; of a pneumatic tire for motorcycles when the motorcycle turns with its body largely leaned (tire circumferential direction).
Figure 6:
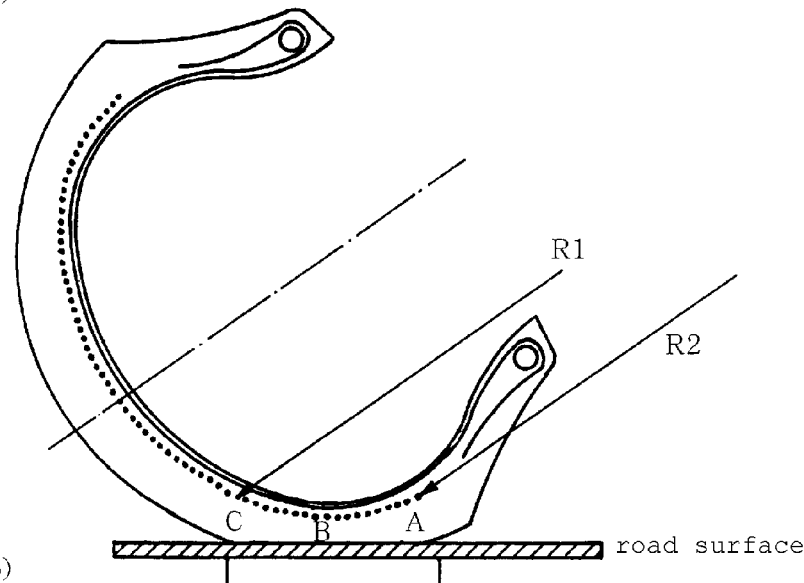
FIG. 6 is (a) a cross-sectional view showing a contact condition, and (b) a illustration showing a contact shape and a state of deformation of the tread portion; of a pneumatic tire for motorcycles when the motorcycle turns with its body largely leaned (tire width direction).
Figure 6:
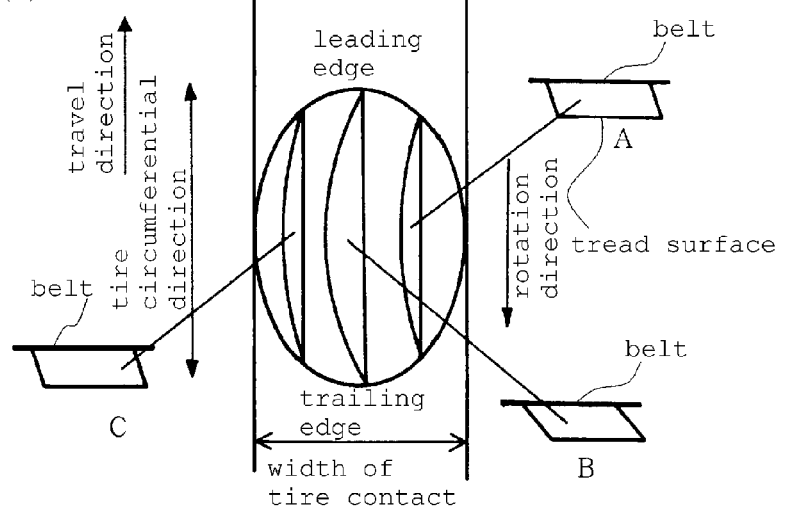

In general bikes, the side portion of the tire contacts a road surface when the tire contacts a road surface with the camber angle being 45 to 50°. That is, 25 parts of the region on one of the tread side portions contact a road surface. In the present invention, the tread side portion is divided into three equal parts which are defined respectively from the tread end as the region A, the region B and the region C. The tread side portion is divided into three equal parts because, as shown in FIG. 5 and FIG. 6, when the motorcycle turns with the CA being 45 to 50°, each region of the region A, the region B and the region C which are divided shows a characteristic behavior. That is, as described above, with respect to the cross section in the tire circumferential direction, the conditions are as follows: the region A: braking; the region B: neutral (no deformations); and the region C: driving deformation. The conditions with respect to the cross section in the tire width direction are as follows: the region A: small lateral shear; the region B: large lateral shear; and the region C: small lateral shear.

With respect to the regions A to C, in the present invention, it is important that the average modulus of elasticity of the tread rubber in the region B at 100% elongation at a temperature of 40° C. is set larger than the average modulus of elasticity of the tread rubber in the region A and in the region C at 100% elongation at 40° C. That is, the modulus of elasticity in the region B is defined larger than that in the other two regions. In this case, the modulus of elasticity in the region B may be larger than those in the region A and C, and both of the moduli of elasticity in the region A and the region C may the same or either of the moduli of elasticity in the region A and the region C may be larger than the other.

Average modulus of elasticity is employed for modulus of elasticity in each region because, in some cases, different types of rubbers in the thickness direction of the tread are used due to the thickness of the tread which motorcycles have. Therefore, for example, in the case where the tread is comprised of two layers and the modulus of elasticity in the inner layer is large and the modulus of elasticity in the outer layer is small, when the thicknesses of the two layers are the same, the average modulus of elasticity is simply the average of both the moduli of elasticity, and when the thicknesses of the two layers are different, the average modulus of elasticity is calculated by averaging the moduli of elasticity while taking the thickness (the volume) into consideration. For example, in the case where the thickness of the inner tread rubber is 3 mm and the modulus of elasticity of the inner tread rubber is 100, and the thickness of the outer tread rubber is 4 mm and the modulus of elasticity of the outer tread rubber is 150, the average modulus of elasticity is calculated to be 129 by the following equation:

$$(100 \times 3 + 150 \times 4)/(3+4) = 129.$$

In some cases, the modulus of elasticity of the tread varies in the tread width direction not in the tread thickness direction. For example, a case where, when the region B is divided into two parts by a cross section which is parallel to the tire circumferential direction, different types of rubbers are used on the tire center side and the tread end portion side in the width direction, corresponds to the above case. Also in this case, the average modulus of elasticity is averaged in accordance with the volume. The average modulus of elasticity in the present invention is what is meant by the above description.

In the present invention, the modulus of elasticity in the region B is defined large because a large modulus of elasticity in the region B may provide a large camber thrust (the force in the lateral direction). As shown in FIG. 5, in the tire for motorcycles which turns with the CA being 45 to 50°, deformations are generated in the longitudinal direction (the tire equatorial direction or the circumferential direction), such as, region A: braking; and region B: driving, which do not contribute to the lateral force (camber thrust). When the shear force due to these deformations is large, the tread is unable to adhere to a road surface to slide in the circumferential direction. This slide causes wear of the tire. Accordingly, in the present invention, the modulus of elasticity in the region B is defined large, and the moduli of elasticity in the regions A and C are defined small. Because the moduli of elasticity in the regions A and C are small, the shear force is small even when a deformation in the tire circumferential direction is generated. Therefore, the tread does not slide on a road surface and may adhere to a road surface. In this way, the amount of wear in the regions A and C are suppressed.

On the other hand, when the deformation in the lateral direction is confirmed, as shown in FIG. 6, the amount of shear stress in the lateral direction (in a direction at 90° to the tire circumferential direction) in the region B is the largest, and those in the regions A and C are small. That is, as in the present invention, a large modulus of elasticity in the region B can provide a large camber thrust in the region B, which is very effective. On the other hand, because the amount of shear stress in the regions A and C is inherently small, a decrease in the modulus of elasticity in the regions A and C does not contribute much to the amount of decrease in the camber thrust. On the contrary, a decrease in the modulus of elasticity in the regions A and C allows the regions A and C not to slide in the tire circumferential direction resulting in adhesion of the tread, which increases the coefficient of friction in the regions A and C, and, in some cases, force may be exhibited in the lateral direction. Because it is known that the coefficient of static friction is larger than that of kinetic friction, when the tread adheres to a road surface without sliding, the coefficient of friction can be maintained high. As shown in FIG. 5, the regions A and C have properties of sliding in the tire circumferential direction. Without this sliding in the tire circumferential direction, the regions A and C are in a completely adhered state with a road surface and, in some cases, the frictional force in the lateral direction may be increased because the coefficient of friction may be applied as the coefficient of static friction.

In contrast to the above, when all of the moduli of elasticity of the regions A, B and C are high, although a large camber thrust in the lateral direction in the region B may be generated, the tread slides in the circumferential direction in the regions A and C. This not only causes wear in the regions A and C, but also causes decrease in the coefficient of friction due to the sliding in the region A and C, which fails to exhibit force in the lateral direction. On the other hand, when all of the moduli of elasticity of the region A, B and C are low, although sliding in the equatorial direction (the circumferential direction) is decreased in the regions A and C, the shear force of the tread in the lateral direction in the region B is decreased to lower the camber thrust.

As described above, in the present invention, it is effective with respect to the lateral force (grip) that, when the region which contacts a road surface at the CA of 45 to 50° is divided into three parts, only the modulus of elasticity in the region B is increased and the moduli of elasticity in the regions A and C are maintained at low levels. This is also effective with respect to the wear of the tire.

In the present invention, the difference between the modulus of elasticity in the region B and the modulus of elasticity in the region A preferably satisfies the following equation:

the modulus of elasticity of $A \times 1.1 \leq$ the modulus of elasticity of $B \leq$ the modulus of elasticity of $A \times 3$.

Unless the modulus of elasticity in the region B equals or is larger than the product of the modulus of elasticity of A and 1.1, the effect obtained is limited. On the other hand, when the modulus of elasticity in the region B equals or is larger than the product of the modulus of elasticity of A and 3, the physical properties of the rubbers differ too much and there is a risk of a delamination fracture which occurs on the interface between the regions A and B. More preferably, the difference between the modulus of elasticity in the region B and the modulus of elasticity in the region A satisfies the following equation:

the modulus of elasticity of $A \times 1.25 \leq$ the modulus of elasticity of $B \leq$ the modulus of elasticity of $A \times 2$.

Still more preferably, the difference between the modulus of elasticity in the region B and the modulus of elasticity in the region A equals 25% or larger, and equals 200% or less. The effect will be more clear when the difference equals 25% or larger. In addition, the same is true in the case of the difference between the modulus of elasticity in the region B and the modulus of elasticity in the region C.

In the present invention, the modulus of elasticity of each region is set at a temperature of 40° C. because the temperature of the tread shoulder portion during a turn is approximately 40° C. when a general user driving a motorcycle on an open road. Because the tread shoulder portion is used only at a turn, the temperature of the tread shoulder portion rises only at a turn. In the case of a road mainly comprised of straight parts, the temperature of the tread rubber on the tread side portion is nearly the air temperature. However, the temperature of the tread rubber on the tread side portion rises instantly at a turn. Although the temperature varies according to the circumstances such as it is summer, winter, or other environments (i.e., in a foreign country), in the present invention, the temperature was defined 40° C. on average.

In the present invention, the average moduli of elasticity of the tread rubber in the region A, region B and region C at 100% elongation at a temperature of 40° C. preferably satisfy:

region $B$>region $C$>region $A$.

There is a difference between the region A and the region C, which difference is that the region A is always out of the center of the contact shape. That is, the region A is always the end portion of the contact shape because the region A is on the tread end of the tread side portion. In contrast, in some cases, the region C is not the end of the contact shape but the center portion of the contact shape when the motorcycle with the CA being 45 to 50° is back to the position with the CA being 40° or 35°. That is, in a case that the contact condition of the motorcycle with near the maximum bank angle is as shown in FIG. 5, the region A always shows a braking behavior of the region A. On the other hand, the region C is not always in a driving state and, when the motorcycle gets slightly upright, the region C lies at the center of a portion contacting with a road surface to change the driving state into a neutral state. Further, in this case, the region C is a region which gains the most camber thrust, corresponding to the center of FIG. 6.

As described above, although the region A is always used in the same manner, in some cases, in the region C, the modulus of elasticity may be high or low depending on the bank angle of the body of the motorcycle. From this point of view, a soft rubber is always appropriate in the region A. In addition, particularly in a motorcycle race or the like, because an angle of the CA of 45 to 50° is frequently used, the region B is preferred to be hard, by setting importance on the region. Because the region C is frequently used when the CA is 45 to 50°, the region C is preferred to be softer than the region B. On the other hand, because the region C can be the center of the portion which contacts with a road surface when the CA is 40° or 35°, the region C is preferred to have some hardness. Therefore, it is appropriate that the values of modulus of elasticity in the regions A to C be in the following order: the region B>the region C>the region A, not only in the case that the CA is 45 to 50° but also in the case of a bank angle at which the motorcycle gets slightly upright from the position with the CA being 45 to 50°, for maintaining the grip performance.

Further, in the present invention, the tread rubber in the region B comprises two layers which are an inner layer and an outer layer, and the average modulus of elasticity of the tread rubber in the inner layer at 100% elongation at a temperature of 40° C. is preferably larger than the average modulus of elasticity of the tread rubber in the outer layer at 100% elongation at 40° C. for two reasons.

The first reason is a manufacturing one. In manufacturing the tire for motorcycles, to add excessively the number of rubber types leads to a high production cost. About, at most, four types of rubber is the limit in terms of cost, and when the number of types of rubber is increased over the limit, the tire is unprofitable. Therefore, by preparing the region which comprises two layers of two hard and soft rubbers, the modulus of elasticity of the tire can be controlled depending on how the layers are piled.

The second reason resides in grip ability. The surface of the tire tread is preferred to be soft rubber, because the rubber may bite into the uneven road surface and the grip ability increases. That is, by placing a hard rubber inside the tread to secure the rigidity of the tread and softening the outer tread surface, a bite into a road surface is secured. When these cases are considered, the double layer tread rubber is effective.

Further, in the present invention, the tread rubber which constitute the tread surfaces of the region A and the region B is also preferred to be comprised of the same type of rubber. When the same type of rubber covers the tread surface in the region A and the region B, the number of rubber types is saved. Further, in this case, when a hard rubber is placed inside the region B, the average modulus of elasticity of the region B may be higher than that of the region A.

In the present invention, considering sport motorcycle tires or racing motorcycle tires, the average modulus of elasticity of the tread rubber at 100% elongation at a temperature of 100° C. is employed in place of the average modulus of elasticity of the tread rubber at 100% elongation at a temperature of 40° C. Such a motorcycle not only travels in straight lines but also corners at a high speed and severely. Therefore, the temperature of the tread side portion reaches 100° C. or more. Further, particularly in motorcycle racings, the temperature of the tread side portion is hard to fall due to successive corners and in some cases reaches 120° C. In view of these circumstances, in the cases of sport motorcycle tires or racing motorcycle tires, it is required that the above-described conditions be satisfied with respect to the average modulus of elasticity at a temperature of 100° C.

Further, in the present invention, it is preferred that the average tan δ of the tread rubber in the region B at a temperature of 100° C. be smaller than that in the region C. Although, in the present invention, the tread rubber in the region B is set hard to increase the camber thrust (the lateral force Fy), the region B is inclined to generate heat due to a large deformation in the region B. Because the effect of the present invention decreases when the temperature elevates due to the heat generation and the tread rubber softens, it is more effective, with respect to the region B, to suppress the heat generation due to this deformation by setting the modulus of elasticity high and setting the tan δ small. On the other hand, although the region C contributes less to the camber thrust than the region B, it is preferable that the tan δ be not small to gain a grip to some extent with a road surface because the region C is used when the motorcycle body gets upright. That is, by increasing the tan δ of the region C to some extent, grip is gained by loss of energy.

Here, the tan δ at a temperature of 100° C. is considered because the temperature of the tread rubber reaches about 100° C. when the motorcycle repeats turns with a large CA using general tires for motorcycles. Although there is a case that a temperature of the tread reaches 120° C. using special racing tires, the value at 100° C. is adopted as a representative because there is a tendency that the lower the tan δ at 100° C., the lower the tan δ at 120° C. In addition, the tan δ is defined because the larger the tan δ (loss tangent) is, the more heat is generated when the same amount of distortions are input repeatedly at the same frequency. The smaller the tan δ, the less heat is generated.

The tan δ of the tread rubber in each of the regions is defined as the average tan δ from the same reason as in the case of the modulus of elasticity. That is, the case that a plurality of rubbers exists in the thickness direction or in the tread width direction is assumed. The method of calculating the average tan δ may also be conducted according to the above-described method of calculating the average modulus of elasticity.

In the tires of the present invention, satisfying the above-described condition with respect to the tread rubber which constitutes the tread portion is important, which provides the desired effect of the present invention. The other conditions such as tire structures and tire materials should not be particularly restricted. For example, the tread rubber in the tread center portion is not limited particularly in the present invention and may be the same as that in the tread side portion or different. For example, because the center portion of the tread often cruises at a high velocity when the motorcycle is upright, the rubber type of the center portion is usually changed from the rubber whose type is used in the tread side portion by employing a rubber which excels in anti-heat-producing property.

Preferably, by installing, as a belt layer 3, a spiral belt layer comprising a reinforcing element(s) having an angle of 0 to 3° with respect to the tire circumferential direction, expansion of the tire by the centrifugal force during a high speed travelling can be prevented and the steering stability during a high speed travelling can be improved.

In this case, as illustrated, although the case may be considered that only the spiral belt layer 3 exists with other intersecting belt layers not being installed, intersecting layers other than the spiral belt layer 3 may be added to be placed into the spiral layer 3. For example, a cord into which an aromatic polyamide is stranded may be added by intersecting at angles of ±60° with respect to the tire circumferential direction. Alternatively, the spiral belt layers may be doubly placed or a belt other than the spiral belt layer may be added having an angle of 90° with respect to the tire circumferential direction and, with the spiral belt layer, a mesh may be formed to be strengthened. Alternatively, without using the spiral belt layer, two or three or more plys of only intersecting belt layers may constitute the belt layer. In this case, for example, a belt into which two plys of cords into which an aromatic polyamide is stranded are intersected at angles of ±30° with respect to the tire circumferential direction may be employed as the belt layer.

In addition, for example, the tire of the present invention, as illustrated, comprises a pair of bead portions 11, a pair of side wall portions 13 extending from the bead portions, and a tread portion 12 extending toroidally between the both side wall portions 13, and a carcass 2 reinforcing each of these portions each other across the bead portions comprises at least one ply of carcass ply which is comprised of textile cords having a relatively high elasticity arranged parallel to one another. The number of carcass ply may be one, two, or three or more. In addition, although, in the illustrated example, both ends of the carcass 2 are held by the bead cores 1 by being folded up from inside of the tire to the outside of the tire, the end of carcass 2 may be fixed by being inserted between the bead wires at bead portion 11 or the end of the carcass 2 may be anchored to the bead core 1. Further, an inner liner is placed in the innermost layer of the tire (not illustrated), and a tread pattern is suitably formed on the surface of the tread portion 12 (not illustrated). The present invention is not limited to radial tires but may be applied to bias tires.

EXAMPLES

The present invention will now be described by way of Examples.

Test tires having a tire size of 190/50ZR17 and a cross sectional structure shown in FIG. 1 were produced under the following conditions and compared. Each of the test tires has two plys of carcasses 2 extending toroidally between a pair of bead portions 11, and the carcasses 2 employ nylon cords in both Conventional Examples and Examples (although, in the Figure, the carcasses 2 are represented as a single line, the single line represents two plys of piled carcasses). Although cord angles of the two plys of carcasses 2 may be the radial direction (the angle of 90° with respect to the tire circumferential direction), carcasses having angles of ±70° with respect to the tire circumferential direction were used by intersecting each other in the present Examples.

In addition, a spiral belt layer 3 was placed outside of the carcass 2 in the radial direction. The spiral belt layer 3 was formed by winding steel cords spirally at a interval of 80 cords per 50 mm, in which single steel wires having a diameter of 0.12 mm were twisted in 1×5 type. The spiral belt layer 3 was produced by a method that two parallel cords are wound on the belt-shaped member (strip) which is embedded in the covering rubber spirally to the direction of the tire rotation axis approximately along the tire circumferential direction. As shown in the Figure, in the tires of Examples the belt layer comprises only a steel spiral belt layer without providing intersecting layers other than the steel spiral belt layer. Outside of the spiral belt layer 3, a tread portion 12 having a thickness of 7 mm is provided. On both tires of Conventional Examples and Examples, no grooves were placed on the surface of the tread portion 12.

Based on the above-described structure, in the tread portion 12, the 50% region of the developed width of the tread whose center is on the tire equatorial plane is defined as "tread center portion", the 25% regions of the developed width of the tread region each of which is on the either side of the tread center portion is defined as "tread side portion", and the tread side portion is divided into three equal parts which are defined from the tread end in order as region A, region B and region C. A test tire of each of the Conventional Examples and Examples was produced by changing the tread rubber in each of the regions A to C according to the following description. In the present Examples, in order to conduct an evaluation test for the test tires on a circuit, sport motorcycle tires were employed, and the moduli of elasticity at a temperature of 100° C. were employed.

Conventional Examples

Figure 4:
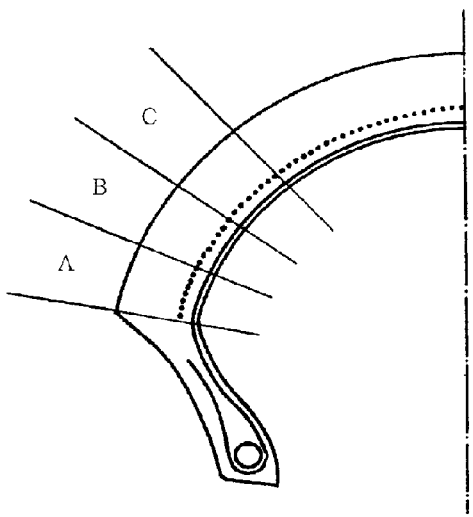
FIG. 4 is a width direction cross-sectional view of a pneumatic tire for motorcycles of the Conventional Example 1.

As shown in FIG. 4, whole region of the tread portion 12 comprised of a tread center portion and tread side portions was produced from a single kind of rubber. The modulus of elasticity of this tread rubber at 100% elongation is 100.

Example 1

As shown in FIG. 1, only the physical properties of the tread rubber in the region B in the tread side portion were changed. That is, the modulus of elasticity of the region B at 100% elongation was 150.

Example 2

Figure 2:
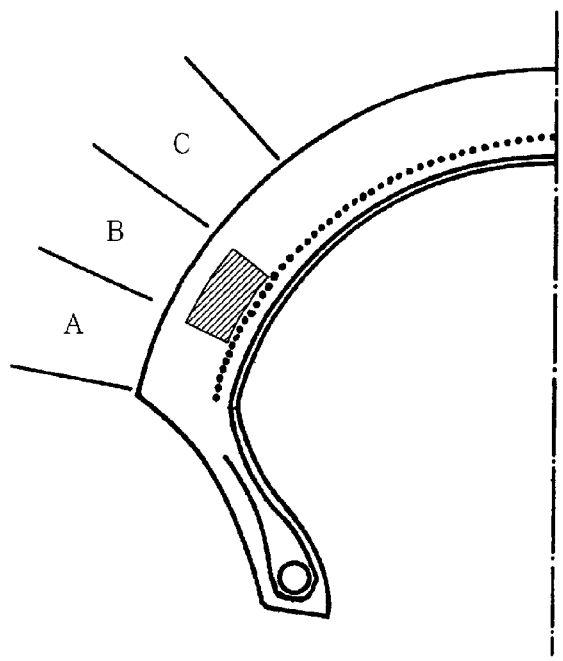
FIG. 2 is a width direction cross-sectional view of a pneumatic tire for motorcycles of the Examples 2, 4 and 5.

As shown in FIG. 2, only the tread rubber in the region B in the tread side portion was comprised of two layers which are an inner layer and an outer layer. The outer tread rubber in the region B was the same rubber as in the region A. Only the physical properties of the tread rubber in the inner tread rubber in the region B were changed. That is, the thicknesses of the two layers were 4 mm for the inner tread rubber and 3 mm for the outer tread rubber. The modulus of elasticity of the outer tread rubber at 100% elongation was 100 and the modulus of elasticity of the inner tread rubber at 100% elongation was 150. Thus, the average modulus of elasticity in the region B was 129.

Example 3

Figure 3:
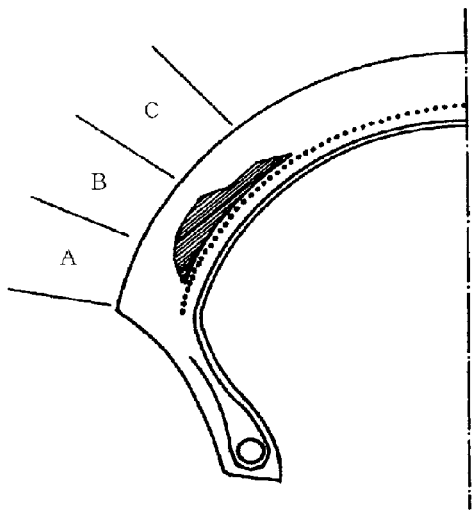
FIG. 3 is a width direction cross-sectional view of a pneumatic tire for motorcycles of the Example 3.

As shown in FIG. 3, in the tread side portion, the thickness of the inner tread rubber was 4 mm and the thickness of the outer tread rubber was 3 mm in the region B, and the thickness of the inner tread rubber was 2 mm and the thickness of the outer tread rubber was 5 mm in the region C. The region A is comprised of one layer. In the boundary between the region A and the region B, and the boundary between the region B and the region C, the boundary faces between the inner tread rubber and the outer tread rubber are diagonal because a delamination fracture on the boundary faces between the rubbers hardly occurs when the boundary is diagonal and smooth as illustrated as compared to when sharp corners are formed in the boundary. In the Example 3, in the same manner as in the Example 2, the modulus of elasticity of the outer tread rubber at 100% elongation was 100 and the modulus of elasticity of the inner tread rubber at 100% elongation was 150. In the Example 3, the average moduli of elasticity of the region A, the region B and the region C were 100:129:114, respectively and in order: region B>region C>region A.

Example 4

In the same manner as in the Example 2, only the tread rubber in the region B in the tread side portion was comprised of two layers which are an inner layer and an outer layer. The outer tread rubber in the region B was the same rubber as in the region A. The modulus of elasticity of the inner tread rubber at 100% elongation was 200. The other conditions were the same as in the Example 2. The average modulus of elasticity in the region B was 157.

Example 5

In the same manner as in the Example 2, only the tread rubber in the region B in the tread side portion was comprised of two layers which are an inner layer and an outer layer. The outer tread rubber in the region B was the same rubber as in the region A. The modulus of elasticity of the inner tread rubber at 100% elongation was 300. The other conditions were the same as in the Example 2. The average modulus of elasticity in the region B was 214.

<Lateral Force Evaluation>

For each of the test tires, camber thrust measurement was conducted using a 3-meter-drum. A drum made of steel having a diameter of 3 m was used, each of tires was pressed against the drum with the CA being 40° and 50°, and then the camber thrust (lateral force Fy) at the time was measured. Because the surface of the drum was smooth, a number #40 sandpaper was stuck along the circumference of the drum to be liken to a road surface. Each of the tires was filled to an inner pressure of 210 kPa and driven at a velocity of 80 km/h, a load of 1500 N (about 150 kgf) and an SA (Slip Angle) of 0°, and lateral forces in two standards that the CA is 40° and that the CA is 50° were measured. The tires generated heat and a temperature at the tread side portion was 110° C. because the velocity was as high as 80 km/h.

By taking the value 1350 N of the lateral force Fy of the tire of the Conventional Example at the CA of 40° as 100 and taking the value 1490 N of the lateral force Fy of the tire of the Conventional Example at the CA of 50° as 100, each of the values of the lateral forces Fy of the test tires of the Examples at the CA of 40° and at the CA of 40° was shown as an index. The results are shown in Table 1 below. The large number shows that the lateral force is large.

extent, the effect was exhibited at the CA of 40° at which the region C is the center of the portion that contacts a road surface.

<Real Motorcycle Test>

The results of steering performance test using a real motorcycle to verify the improvement effect of the performance of the tires for motorcycles of the present invention will now be described. Because the test tires were for rear-wheels, the real motorcycle test was conducted while only rear tires were changed and the front tire was always fixed as a conventional tire. The evaluation method is described in the following. The temperature of the tread of the tire after traveling was about 100° C.

The above-described test tires were mounted on a 1000 cc sport motorcycle, and the motorcycle traveled ten circles of the test course. The steering stability (cornering performance) of the motorcycle at turns with the motorcycle body largely leaned was mainly evaluated. The evaluation was conducted by the overall 10 points judgment by the feeling of the test rider. The rider performed a marginal run. The results are also shown on the above Table 1.

The results have much the same tendency as the results of the indoor measurement of the Fy. A characteristic feature is in the comparison of the Example 1 with the Example 4 that the point of the Example 4 is clearly higher than that of the Example 1 although the moduli of elasticity in the region B are nearly the same. This is thought to be because, in the case of the Example 4, the soft rubber on the surface of the region B bit well into a rough uneven road surface to grip.

Another characteristic feature is that the Example 3 marked the highest point 9. This is because the rider also evaluated the high grip at the CA of 40°.

<Wear Evaluation>

Finally, the amount of wear of each of the test tires was compared. After measuring the weight of a new tire and the

TABLE 1

|  | Tread Rubber Configuration | Modulus of Elasticity*1 | | | CA 40° Fy | CA 50° Fy | Scores on Real Motorcycle |
| --- | --- | --- | --- | --- | --- | --- | --- |
|  |  | Region A | Region B | Region C |  |  |  |
| Conventional Example | FIG. 4 | 100 | 100 | 100 | 100 | 100 | 5 |
| Example 1 | FIG. 1 | 100 | 150 | 100 | 101 | 107 | 7 |
| Example 2 | FIG. 2 | 100 | 129 | 100 | 101 | 105 | 7 |
| Example 3 | FIG. 3 | 100 | 129 | 114 | 105 | 105 | 9 |
| Example 4 | FIG. 2 | 100 | 157 | 100 | 101 | 108 | 9 |
| Example 5 | FIG. 2 | 100 | 214 | 100 | 102 | 106 | 7 |

*1The modulus of elasticity in each region means the modulus of elasticity in each region at 100% elongation at a temperature of 100° C., and when two or more types of rubber exist in each region, the modulus of elasticity means the average modulus of elasticity in which the volumes of the rubbers are taken into consideration.

The present invention is directed to the case that the CA is near the maximum bank angle (bank angle=CA) of 45° to 50°. As is apparent from the above Table 1, in any of the test tires of the Examples 1 to 5, Fy on the drum at the CA of 50° improved.

By comparing the Example 2, 4 and 5, the modulus of elasticity, about 130, in the region B clearly has an improvement effect of Fy, and the modulus of elasticity, about 160, in the region B has more effect. However, when the modulus of elasticity in the region B is about 210, the effect is inclined to be weakened. Therefore, the modulus of elasticity, about 150, seems to be most preferable.

In the Example 3, the Fy at the CA of 40° is also effectively increased. This is because, by strengthen the region C to some weight of the tire after the test run, the amount of wear was evaluated by the difference between the weights. Since the wear occurs for the most part in the tread side portion, the wear is thought to correspond nearly to the amount of wear in the side portions. As a result, the amount of abrasion of each of the test tires in the Examples 1 to 5 was discovered to be smaller than that of the tire in the Conventional Example by 7 to 15%.

From these results, in the tires of the Examples, a grip at a turn and wear resistance are compatible. That is, it has been confirmed that the performance of the test tire of each of the Examples according to the present invention greatly improves as compared to the tire in the Conventional Example.

The invention claimed is:

1. A pneumatic tire for motorcycles comprising bead cores embedded in each of a left-and-right pair of bead portion; at least one ply of carcass extending toroidally between said pair of bead portions; at least one ply of belt layer installed outside of the carcass in the direction of the radius of the tire; and a tread portion placed outside of the belt layer in the direction of the radius of the tire,
   wherein when, in said tread portion, the 50% region of the developed width of the tread whose center is on the tire equatorial plane is defined as "tread center portion", the 25% regions of the developed width of the tread region each of which is on the either side of the tread center portion are defined as "tread side portion", and each of the tread side portions is divided into three equal parts which are defined from the tread end in order as region A, region B and region C,
   the average modulus of elasticity of the tread rubber in the region B at 100% elongation at a temperature of 40° C. is larger than the average modulus of elasticity of the tread rubber in the region A and in the region C at 100% elongation at 40° C.
   wherein the average moduli of elasticity of the tread rubber in the region A, region B and region C at 100% elongation at a temperature of 40° C. satisfy:
   region B>region C>region A.

2. The pneumatic tire for motorcycles according to claim 1, wherein the tread rubber in the region B comprises two layers which are an inner layer and an outer layer, and the average modulus of elasticity of the tread rubber in the inner layer at 100% elongation at a temperature of 40° C. is larger than the average modulus of elasticity of the tread rubber in the outer layer at 100% elongation at 40° C.

3. The pneumatic tire for motorcycles according to claim 1, wherein the tread rubbers which are the tread surfaces in the region A and the region B are the same type of rubber.

4. The pneumatic tire for motorcycles according to claim 1, wherein the average modulus of elasticity of the tread rubber in the region B at 100% elongation at a temperature of 100° C. is larger than the average modulus of elasticity of the tread rubber in the region A and in the region C at 100% elongation at a temperature of 100° C.

5. The pneumatic tire for motorcycles according to claim 1, wherein the average tan δ of the tread rubber in the region B at a temperature of 100° C. is smaller than the average tan δ of the tread rubber in the region C at a temperature of 100° C.

* * * * *